Dec. 15, 1931.   W. H. KNIGHT ET AL   1,836,471
CHUCK ASSEMBLY FOR MACHINE TOOLS
Filed Sept. 23, 1929
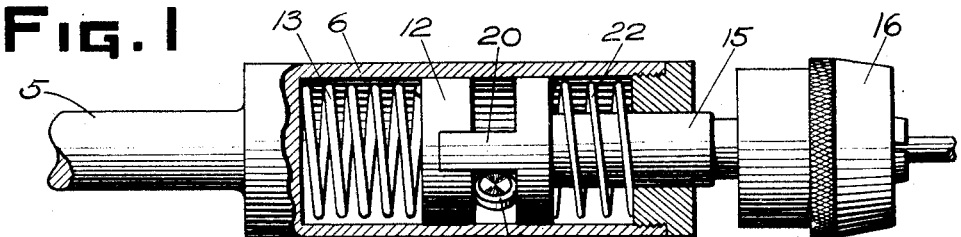
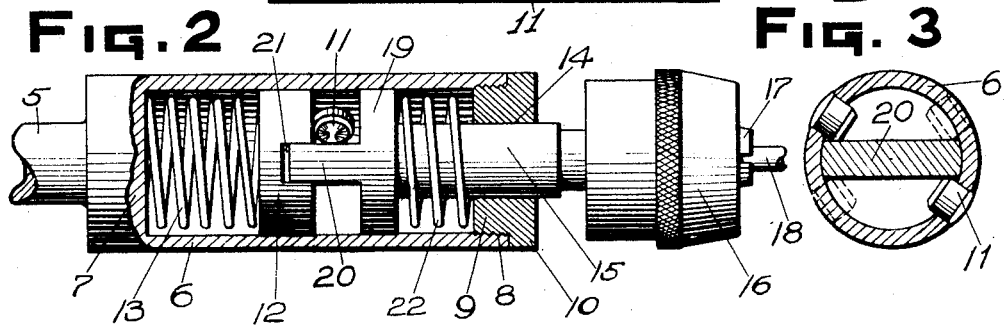
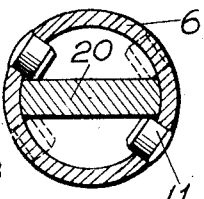
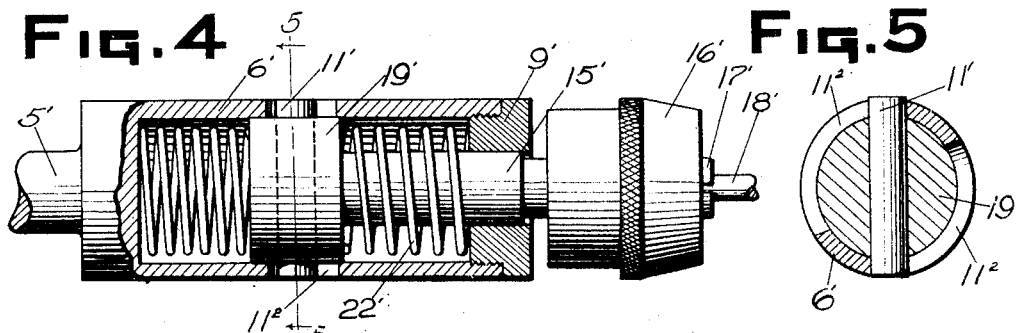
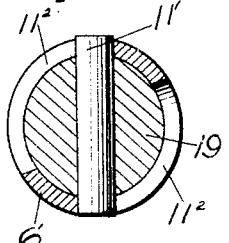
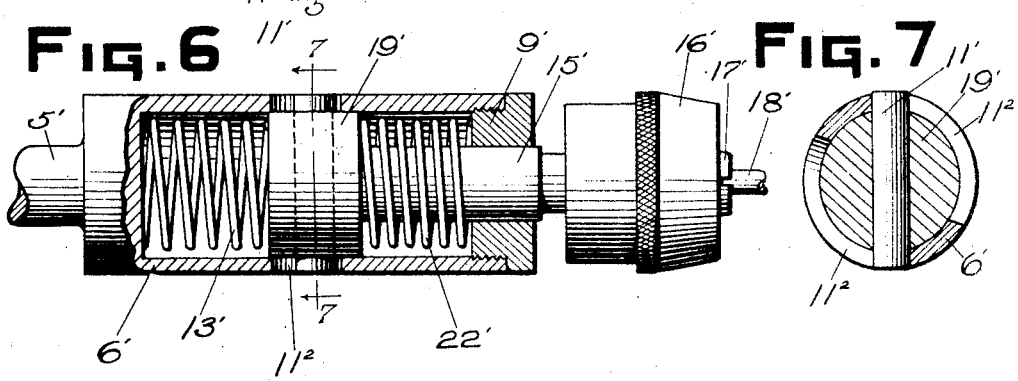
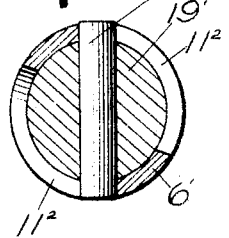
INVENTORS
W. H. KNIGHT
C. A. WALDSMITH
BY
*William H Knight*
ATTORNEY.

Patented Dec. 15, 1931

1,836,471

UNITED STATES PATENT OFFICE

WILLSON H. KNIGHT AND CECIL A. WALDSMITH, OF ROCKFORD, ILLINOIS, ASSIGNORS TO THE INGERSOLL MILLING MACHINE COMPANY, OF ROCKFORD, ILLINOIS, A CORPORATION OF ILLINOIS

CHUCK ASSEMBLY FOR MACHINE TOOLS

Application filed September 23, 1929. Serial No. 394,438.

The present invention relates in general to machine tools and has particular reference to a chuck assembly for such tools which is especially adapted for tapping operations.
Difficulty is frequently experienced in tapping operations, especially with those machines employing a multiplicity of taps, due to the absence of means for automatically preventing the taps from continuing to rotate at the edge of the tapped hole after completion of the tapping cycle. When this happens the tapped thread is often destroyed or at least made so unserviceable as to require a secondary operation before it can be passed. Difficulties of this nature are mostly encountered with a multiple tapping machine as a result of one or more taps finishing their backing up operation ahead of others and continuing to rotate at the edge of the hole until all of them are free so that the head in which they are collectively mounted may be moved back far enough to clear all of them.

The primary object of the present invention is to provide simple and cheap yet effective means for causing a tap, or any one or more taps in a multiple tapping machine, to instantaneously clear the hole at the completion of the backing up half of its cycle of operation.

Since the application of the invention is of special utility in combination with a tapping machine employing a multiplicity of taps its advantages will be hereinafter brought out in this connection. It will be understood, however, that this particular use is not necessarily the limit of its practical application.

Other objects of the invention will appear hereinafter, the novel features and combinations being set forth in the appended claims.

One embodiment of the invention is presented herein for the purpose of illustration but it will of course be understood that the invention is susceptible of other different modified embodiments which come equally within the scope of the appended claims.

In the accompanying drawings:—

Fig. 1 is a view in side elevation and partly in section of one form of the chuck assembly;

Fig. 2 is a similar view of the same form but showing the parts in a different position of operation;

Fig. 3 is a cross-section of the form shown in Figs. 1 and 2;

Fig. 4 is a view in side elevation and partly in section of another form of the invention;

Fig. 5 is a view in cross section taken on the line 5—5 Fig. 4;

Fig. 6 is a view similar to Fig. 4 but showing the parts in a different position of operation, and Fig. 7 is a cross-section taken on the line 7—7 Fig. 6.

In the two co-pending applications of Arthur H. Lyon, Serial Nos. 379,737 and 381,156, filed July 20, 1929, and July 26, 1929, respectively, and assigned to the same assignee as the present application two different types of multiple spindle tapping machines are shown as equipped with means for accomplishing the particular object of the present invention, namely, the provision of means for causing a tap, or any one or more taps in a multiple spindle tapping machine, to immediately clear the hole after the completion of the backing up half of its cycle of operation. In these two prior examples part of the mechanism for accomplishing the objective is intimately associated with the machine and part of the mechanism is contained in the chuck assembly.

The present invention provides means whereby all of the mechanism for accomplishing the objective may be contained wholly in the chuck assembly so that a chuck constructed in accordance with the invention may be marketed as a self contained unit and adapted for use with any type of tapping machine, conventionally or otherwise designed without reconstructing the machine or requiring the addition of attachments.

Referring now to the accompanying drawings, 5 represents a tool shank which is fashioned to fit a conventional spindle or other driving part of a machine tool such as used in a tapping machine. The spindle 5 according to the preferred construction of the present invention terminates at one end with an integral barrel-like part 6, the internal bore of which being closed at its rear end by the end wall 7, and with its opposite end internally threaded as at 8, for accommodating a threaded retainer plug 9, which is made with a radial flange 10. Entering the barrel 6 from diametrically opposite sides are a pair of studs 11. Confined behind the studs 11 is a follower 12 which is made to fit the bore of the barrel but not so tightly as to bind, since it is necessary that the same have a limited sliding movement within the barrel. Behind the follower 12 is a compression spring 13, which is confined between the end wall 7 and the follower. The tension of the spring 13 is normally stiff enough to hold the follower 12 against the studs 11. Entering the barrel from the plug end through a center opening 14 in the retainer plug 9 is a collet member 15. The term "collet member" has been selected to indicate this part of the device since it best describes the construction in the drawings selected for illustration.

It is to be understood, however; that any other member corresponding to the collet member which serves the same function, and is the equivalent thereto, may be employed in its stead.

The outer end of the collet member 15 carries a chuck proper 16, which is equipped with the customary jaws 17 for gripping the tap shank 18. The opposite end of the collet member 15 is made with an enlargement 19, which fits the internal bore of the barrel 6. Extending axially from the enlargement 19 is a tongue 20, which fits in a radial slot 21 in the face of the follower 12. Coiled around the collet member 15 and confined between the retainer plug 9 and the enlargement 19 is a spring 22, which is wound to exert a retracting influence on the collet member. Spring 13 is of greater stiffness than the spring 22, and in this connection it is desirable that the spring 13 be made stiff enough to overcome any ordinary resistance that the tap will meet with.

When the tapping operation commences the parts will assume relative positions as indicated in Fig. 1. When the tap reaches the end of the hole and the machine is reversed, the barrel 6 rotates substantially 120 degrees relative to the collet member 15, whereupon studs 11 change their positions and hit the tongue 20 a hammer blow which will break the tap loose, thus preventing the possibility of twisting the tap off should it be stuck when the machine is reversed. During the time that the barrel 6 is rotating relative to the collet member 15 a backward pull is imparted to the barrel as a result of the reversal of the feed screw of the machine or other means which returns the head that carries the tools, and as a result the barrel is moved axially of the collet member 15, compressing the spring 22, thus placing a retracting tension on the collet member, which is maintained throughout the backing up operation and just as soon as the tap clears the hole it is released to the influence of the spring 22, and the spring in expanding snaps the collet member rearwardly, pulling or kicking the tool clear of the hole. As a result of this retracting kick or snap imparted to the tool immediately as it is released from the threads of the hole, the tap will not continue to rotate at the edge of the hole waiting for the other taps to complete their backing up operation.

The invention thus serves two important objects, one being to break the tap loose and the other being to clear it of the edge of the hole immediately upon completion of its backing-up operation.

The spring 13 plays no part in either of these two important functions of the device and may be dispensed with entirely if it is unnecessary to cushion the tapping feature of the operating cycle.

While the above description is thought to clearly explain the detail construction and the operating method of the device, it perhaps will help a thorough understanding of the many desirable features of the invention if it is explained that the barrel 6 is in reality a driving element and that the collet member 15 is a spring influenced floating driven element; that the studs 11 and the tongue member 20 provide a drive transmitting connection between these two elements which is operable to cause momentary relative rotation of the driving element upon a change in the direction of the drive imparted to the elements. Properly this combination represents the salient features of the invention with the simplicity and cheapness in construction of the device representing other salient features which are, of course, also to be considered.

In Figs. 4 to 7 inclusive a modified embodiment of the invention is illustrated and in each the spindle 5' carries a barrel-like part 6' having a retainer plug 9' as in the other form, but in this modified form the collet member 15' is made with a different kind of an enlargement 19'. The enlargement 19' does not have a tongue member 20 but instead is thicker in structure and serves as an abutment for one end of the cushioning spring 13', and also carries a pin 11' which extends transversely through the enlargement and terminates in ends which are confined in opposed segmental slots $11^2$ cut diametrically in opposite sides of the barrel 6'. A spring 22' is coiled around the collet member 15' between the retainer plug 9' and the enlargement 19'.

The device in this modified form will operate in substantially the same manner as explained with reference to the first mentioned form and we do not believe that the same requires any further explanation. It may be understood, of course, that the shank 18' of the tapping tool is held in the jaws 17' of the chuck 16'.

Having thus described and shown an embodiment of this invention, what we claim and desire to secure by Letters Patent of the United States is:

1. A chuck assembly for tapping tools, comprising rotatable drive transmitting elements co-axially mounted with restricted axial movement relatively to one another, resilient means for restraining the axial movement of said elements in opposite directions relatively to one another and a lost motion drive transmitting connection between said elements operable to cause unrestrained momentary relative rotation in any relative axial position of said members and only upon a change in the direction of the drive imparted thereto.

2. A chuck assembly for tapping tools, comprising co-axially mounted rotatable driving and driven elements, means connecting said elements with restricted and unrestrained relative rotation and restricted relative axial movement and spring means for resiliently restraining the relative axial movement between said elements in opposite directions; the means connecting said elements with restricted relative rotation being thus effective in any relative axial position of the elements.

3. A chuck assembly for tapping tools, comprising co-axially mounted rotatable driving and driven elements, means connecting said elements with restricted relative rotation and restricted relative axial movement and separately acting differential springs for resiliently restraining the relative axial movement between said elements in opposite directions; the means connecting said elements with restricted relative rotation being thus effective in any relative axial position of the elements.

4. A chuck assembly for tapping tools, comprising a barrel-like part having a shank extending from one end thereof, diametrically opposed studs projecting into said barrel intermediate the ends thereof, a follower confined in said barrel by said studs, a compression spring behind said follower, a collet member extending into said barrel through a plug threaded into the end thereof opposite said shank, an enlargement on the end of said collet member fashioned to fit the diameter of the barrel, and disposed to abut against said studs to limit the insertion of the collet member in the barrel, an axially extending tongue on said enlargement, fitting into a slot in the face of said follower, and a spring coiled around said collet member between the enlargement on the end thereof and said plug for retracting the collet member in the barrel.

5. A chuck for tapping tools, comprising driving and driven elements, means providing for restricted axial movement of said elements and limited unrestrained relative rotation in opposite directions in any position within the range of their relative axial movement, and spring retracting means tensioned by the relative axial movement of the elements to cause a tool carried by the chuck to clear the work after it has been backed out of a tapped hole.

Signed at Rockford, in the county of Winnebago, and State of Illinois, this 20th day of September, 1929.

WILLSON H. KNIGHT.
CECIL A. WALDSMITH.